C. O. LUND.
HOSE RACK.
APPLICATION FILED MAR. 18, 1912.
1,170,173. Patented Feb. 1, 1916.
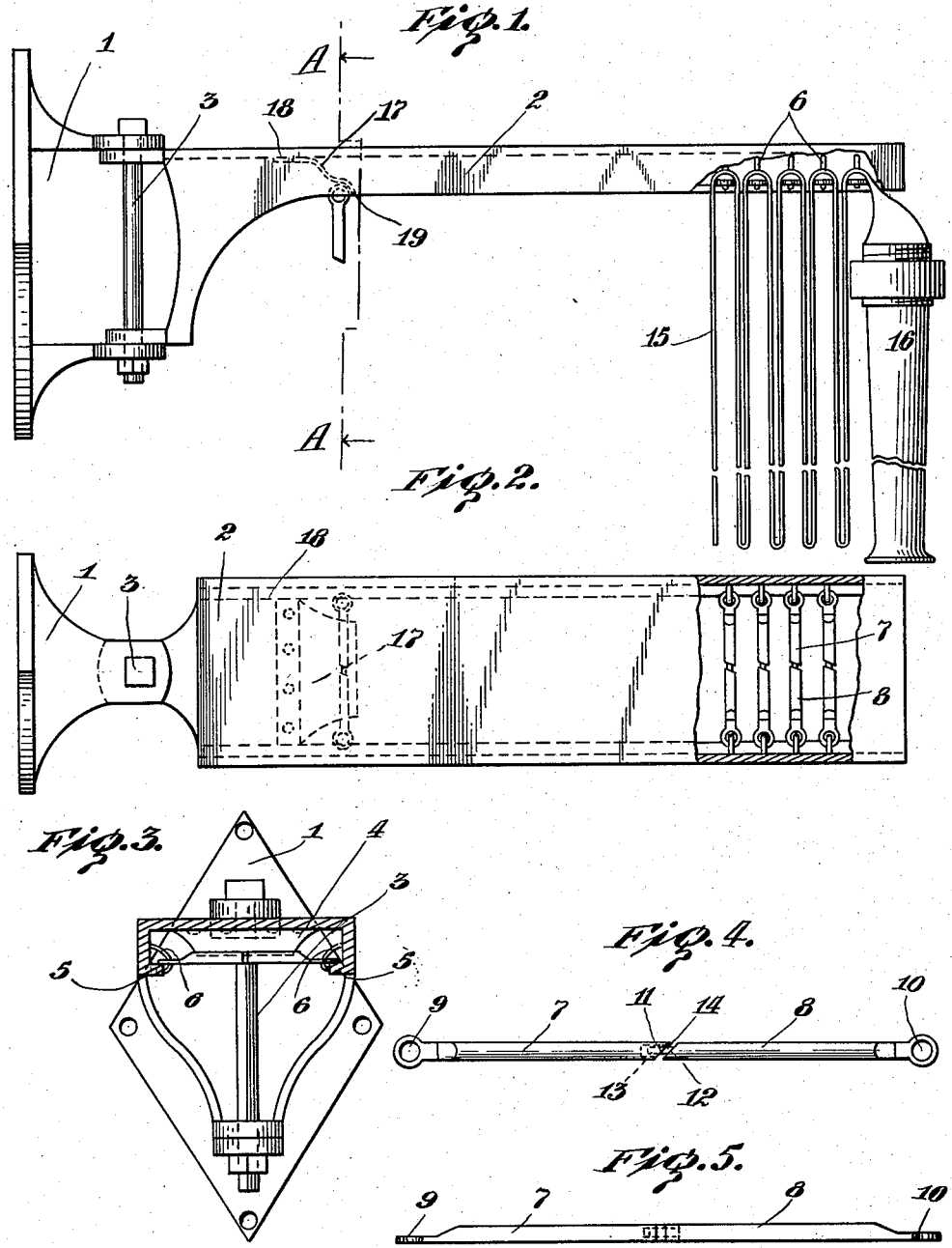
Witnesses:
C. S. Ashley
Ralph J. Sachers
Carl O. Lund Inventor
By his Attorneys
Macdonald & Macdonald

UNITED STATES PATENT OFFICE.

CARL O. LUND, OF BROOKLYN, NEW YORK, ASSIGNOR, BY DIRECT AND MESNE ASSIGNMENTS, OF ONE-HALF TO CARLUND MANUFACTURING COMPANY, OF NEW YORK, N. Y., A CORPORATION OF NEW YORK, AND ONE-HALF TO W. D. ALLEN MFG. COMPANY, OF CHICAGO, ILLINOIS, A CORPORATION.

HOSE-RACK.

1,170,173.      Specification of Letters Patent.      Patented Feb. 1, 1916.

Application filed March 18, 1912. Serial No. 684,583.

*To all whom it may concern:*

Be it known that I, CARL O. LUND, a citizen of the United States, and resident of Brooklyn, in the county of Kings and State of New York, have invented certain new and useful Improvements in Hose-Racks, of which the following is a specification.

It is common practice in modern buildings to provide fire hose at suitable places, connected to the standpipes, for quickly supplying water in case of fire. This hose is usually wound on reels or hung in loops on racks, in a manner that assures the stretching of the hose in a minimum of time without entangling the same.

The hose rack forming the subject-matter of the present application has for its object extreme simplicity, durability and efficiency and consists, principally, in the employment of pins for supporting loops of hose, which pins, in contra-distinction to pins heretofore used for similar purposes, are made of two parts, held together only when supporting the hose, but separating or falling apart when releasing the hose.

One of the forms in which the present invention may be carried out, is illustrated in the accompanying drawings, in which—

Figure 1, is a side elevation of the device, Fig. 2, a top view of the same, Fig. 3, a cross section in the line A—A of Fig. 1, Fig. 4, a top view and Fig. 5, a side view of a supporting pin on an enlarged scale.

A plate 1, secured to the walls of the building by suitable bolts, carries a swinging arm or bracket 2, on a pivot 3. The arm 2 is made of channel iron, having its channel 4 facing downward and provided with ledges 5. The flanges of the channel-iron and the ledges constitute supports for the pins hereinafter referred to. A number of hooks 6, are arranged on each ledge and adapted to carry the pins for supporting the loops of hose. Each pin consists of two parts 7 and 8, the part 7 hung with its eye 9 on a hook 6 on one side of the bracket and the part 8, with a similar eye 10, on a hook 6 of the opposite side of the bracket. The parts are of sufficient length to exactly meet in the center of the bracket and the abutting ends of the parts, are cut in a vertical plane, oblique to the axis of the pin, as shown at 11 and 12 of Fig. 4. One of the parts is provided at its abutting end with a recess 13, the other part of the same pin, with a stud 14, whch may enter the recess 13.

Loops 15 of fire hose are hung over and supported by the pins, as shown in Fig. 1, and the front end of the hose is provided with the usual nozzle 16.

Near the wall end of the bracket 2, and located within its channel 4, is a member or plate 17, secured to the arm by rivets 18, and so arranged that its front edge 19, is located near and parallel to the last or innermost of the pins, holding and supporting the fire hose.

The operation of arranging the fire hose on the pins, consists in bringing the two parts of a pin in substantially a horizontal plane, holding the abutting ends so that the stud 14 is opposite the recess 13, and pressing the parts so as to bring the same in coaxial position and causing the stud to enter the recess. This produces now a rigid pin, extending from one side of the bracket to the other, that is capable of supporting one loop of fire hose. One loop of hose is now arranged thereon and this operation is repeated with each succeeding pair of parts forming one rigid pin after the other, arranging thereon one loop of hose after another, until the entire length of hose, including the nozzle, is supported on the bracket. In order to release the hose, it is only necessary to pull on the nozzle, and the parts forming a pin, will be laterally displaced in such a way that the stud is removed from its recess, the abutting faces of the parts separate, the parts themselves drop down in a vertical position and hang with their eyes on the hooks and one loop of hose is dropped. When the slack in the hose is taken up, a pull is exerted against the second pin, etc., until the entire length of hose is stretched. Should water have been turned on in the meantime, by opening the valve of the standpipe, it will fill the hose, but not further than the last pin which, as heretofore stated, is in contact with the lower edge of the horizontal plate. This horizontal plate, being of resilient material, such as sheet metal, forms an efficient closure with its contacting pin and prevents water from filling the entire hose, until a pull on the hose releases the last loop from the last pin, whereupon water fills the entire hose and may be used through the nozzle, for the purpose intended.

It is not essential that the parts of the pins are hung on hooks. The eyes of the parts may be arranged in vertical planes on rods disposed lengthwise of the bracket and the loops of hose supported on the pins, so formed by the pairs of abutting parts. The hose could again be released by a simple horizontal pull which separates the parts of the pins and drops one loop of hose after the other.

The inventor claims:—

1. A hose-rack having a pair of supporting members, a plurality of pins supported thereby, each of said pins having two parts adapted to maintain each other in horizontal position within the vertical plane of their axes and to release each other when moved out of such plane.

2. A hose rack comprising an arm, a plurality of pairs of hooks on said arm, a pin for supporting loops of hose linked to the hooks of each pair, each pin consisting of two parts and of means for securing together said parts when supporting the hose.

3. In a hose rack the combination with an arm, of a plurality of pins thereon for supporting loops of hose, each pin consisting of two parts and having means for securing together said parts when supporting the hose, said parts being adapted to separate and release the hose when laterally displaced.

4. A hose rack comprising an arm and a plurality of pins thereon for supporting loops of hose, each pin consisting of two parts, the inner ends of said parts abutting in a vertical plane oblique to the axis of said pin, each pin having means for securing together said parts when supporting the hose.

5. A hose rack comprising an arm and a plurality of pins thereon for supporting loops of hose, each pin consisting of two parts, a stud at the inner end of one part, and a recess at the abutting end of the second part to receive said stud for securing together said parts when supporting the hose.

6. A hose rack comprising an arm and a plurality of pins thereon for supporting loops of hose, each pin consisting of two parts, the inner ends of said parts abutting in a vertical plane oblique to the axis of said pin, one of the abutting ends having a stud and the other a recess to receive said stud for securing together said parts when supporting the hose.

7. A hose rack comprising an arm, a plurality of pins thereon for supporting loops of hose, and a member secured to said arm and coöperating with one of said pins whereby the hose is compressed between said member and said pin to prevent the passage of water while the hose is supported.

8. A hose rack having a hose-carrying member and a relatively fixed clamp arranged above said hose-carrying member and coöperating therewith to grip the hose between them, said hose-carrying member being movable relatively to said clamp to release the grip on the hose as the latter is removed from the rack.

9. A hose rack having a relatively fixed clamp and a hose-carrying support arranged beneath and coöperating therewith to grip the hose, said hose carrying support being movable into and out of coöperative relation with said clamp.

In witness whereof the inventor has hereunto set his hand in the presence of two subscribing witnesses, at New York, in the county of New York and State of New York, this 2nd day of March, 1912.

CARL O. LUND.

In presence of—
 W. GERALD HAWES,
 RALPH J. SACHERS.

Copies of this patent may be obtained for five cents each, by addressing the "Commissioner of Patents, Washington, D. C."